United States Patent [19]

Kuwajima et al.

[11] Patent Number: 4,504,609

[45] Date of Patent: Mar. 12, 1985

[54] AQUEOUS COATING COMPOSITION

[75] Inventors: Teruaki Kuwajima, Osaka; Hiroshi Miwa, Hyogo; Katsuaki Kida, Osaka; Shinichi Ishikura, Kyoto, all of Japan

[73] Assignee: Nippon Paint Co., Ltd., Osaka, Japan

[21] Appl. No.: 538,653

[22] Filed: Oct. 3, 1983

[30] Foreign Application Priority Data

Oct. 4, 1982 [JP] Japan ................. 57-174891
Oct. 4, 1982 [JP] Japan ................. 57-174892

[51] Int. Cl.$^3$ .............. C09D 5/02; C09D 3/66; C09D 3/80; C09D 3/81
[52] U.S. Cl. .................. 523/501; 524/457; 524/458; 524/460; 524/501; 524/502; 524/515
[58] Field of Search ............... 523/501; 524/457, 458, 524/460, 501, 502, 515

[56] References Cited

U.S. PATENT DOCUMENTS

| | | | |
|---|---|---|---|
| 3,075,936 | 1/1963 | Bolton | 523/501 |
| 4,151,148 | 4/1979 | Chasin et al. | 523/501 |
| 4,174,332 | 11/1979 | Hönig et al. | 524/502 |
| 4,296,014 | 10/1981 | Hayashi et al. | 523/501 |
| 4,339,371 | 7/1982 | Robinson et al. | 524/460 |

FOREIGN PATENT DOCUMENTS 2102436  2/1983  United Kingdom ............ 523/501

OTHER PUBLICATIONS

Chemical Abstracts, vol. 83, No. 18, Nov. 3, 1975, p. 117, Abstracts 83:149222V; 83:149223W.
Chemical Abstracts, vol. 83, No. 18, Nov. 3, 1975, p. 117, Abstract 83:149223W.

*Primary Examiner*—Ronald W. Griffin
*Attorney, Agent, or Firm*—Wenderoth, Lind & Ponack

[57] ABSTRACT

An aqueous coating composition which comprises (A) at least one aqueous resin selected from acryl, alkyd, polyester, acryl—modified alkyd and acryl-modified polyester resins, (B) at least one component selected from water-insoluble resinous particles having an average grain diameter of 0.01 to 0.1μ, obtained by a polymerization of ethylenically unsaturated compound(s), and (C) optional additives, the weight ratio of said (A) to (B) (in solid) being 99:1~15:85. This aqueous paint is especially useful as a top-coat.

6 Claims, No Drawings

AQUEOUS COATING COMPOSITION

FIELD OF THE INVENTION

The present invention relates to an aqueous coating composition which is useful as top-coat paint and more specifically, to an aqueous type, top-coat paint based on an aqueous resinous composition containing as film-forming components, an aqueous resin and water insoluble resinous particles. The term "aqueous resin" as used herein denotes both water soluble and water dilutable resin.

BACKGROUND OF THE INVENTION

Since a coating composition containing an organic solvent has many problems such as danger of firing and explosion, being harmful to humans and creating a public hazard such as environmental pollution and the like, recently, its market share is decreasing and being replaced by aqueous and/or powder coating compositions. However, in a conventional aqueous coating composition, it is essential for the purpose of dissolving or dispersing the vehicle resin in water to introduce a number of hydrophilic groups in the molecule of said resin, use a quantity of neutralizing agent capable of forming water-soluble salt therewith, and to select such resin as having comparatively lower molecular weight, and therefore, the coating film performance in terms of durability, water resistance or the like is not so good. Secondly, since it is impossible to formulate an aqueous coating composition with a high non-volatile content, application characteristics are not, in general, satisfactory. Thirdly, dispersibility of coloring matter is not very good, so that the use is rather limited, especially in such technical fields as requiring a higher order of finishing appearance, gloss and sharpness, as in the automobile industry. An emulsion coating composition whose resin is prepared by the so-called emulsion polymerization in an aqueous medium, has indeed an advantage that a higher molecular resin can be utilized, but at the same time, has such problems that the preparation of said resin necessitates an emulsion polymerization technique of higher standard, and the surfactant or emulsifier added for emulsification will cause additional problems of decreased durability and water resistance of the film. On the other hand, a powder coating composition has its own problems. That is, if the glass transition temperature is too low, there occurs a blocking phenomenon, which will result in a coating with inferior performance, and the necessity of adopting a considerably higher baking temperature and using a special applicator will obstruct the general use of this coating composition. A coating composition in which the powder coating is dispersed in water as a slurry has also been well known. This comprises as a main ingredient a powder coating. However, in this type of composition, there are problems such that (1) in general, it is difficult to increase the non-volatile content, and therefore, it is difficult to obtain a thicker coating and a satisfactory adhesion of the film to the substrate, and cracks may easily occur in the film.

(2) it is difficult to have an appropriate viscosity and fluidity necessary for the coating by means of, for example, spraying, and thus, there is a problem of working therewith. The coating is also deficient in gloss.

(3) there is a tendency of sedimentation and separation of solid matter while storing the composition.

(4) since a dispersing agent is generally used, there are problems in performance of the film such as water resistance and the like.

Among them, poor working properties are the most troublesome problem, and the slurry composition has not been practically used up to the present, on this account.

Recently, various attempts have been made to overcome the abovesaid drawbacks of the aqueous dispersion type coating composition. The most attractive one is to add to an aqueous slurry of powder coating a water soluble or water dispersible aqueous resin as a modifier. For example, in Japanese Patent Application Nos. 31636/76 and 25224/76, a water dilutable resin in a quantity of 0.5–30 wt % of resin particles is added, together with 0.05–30 wt % coloring matter, to a composition comprising 90 to 30 parts by weight of aqueous medium and 10 to 70 parts by weight of resin particles having a softening point of 5° to 120° C. and a mean diameter of 0.5 to 80 microns, to improve storage stability of the composition. Japanese Patent Application No. 127151/74 discloses a composition comprising 50 to 80% by weight of powdered resin and 20 to 50% by weight of water, compounded with 0.05 to 5 parts by weight of surfactant and 5 to 50 parts by weight of water soluble or dispersible resin per 100 parts by weight of said powdered resin. Also, in Japanese Patent Application Nos. 74606/79 and 170262/79, and Japanese Patent Publication No. 4149/80, mention is made of a water dispersion type coating composition comprising as main components, powder coating and water soluble resin, the content of said water soluble resin being about 10 to 20% of the powdered resin. In either case, water soluble or water dispersible resin is merely added to the water-powdered resin dispersion system as a modifier which will give the role of dispersion stabilizer. They, therefore, all belong to a category of slurry type coating based on powdered resin and hence, can never be free from the drawbacks possessed by themselves, in substance.

The inventors, as the results of extensive studies on water-borne coatings and especially an aqueous coating composition comprising aqueous resin (water soluble resin or water dilutable resin, hereinafter the same) dissolved or dispersed in water, have first found that it is necessary to use a particular type of aqueous resin which will fulfil certain requirements. One requirement is that water tolerance expressed in terms of water dilution (times) of the resin for a solution incapable of reading out the defined type must be more than 4 in a test wherein 5 g of aqueous varnish of the resin having a normal viscosity usually employed in the manufacture of coating composition are correctly weighed in 100 ml beaker, increasing amounts of deionized water are added thereto, and No. 1 type (26 point type) is read through the beaker. The second requirement is that the surface tension of a 1 wt % aqueous solution is less than 51 dyne/cm. If these requirements are satisfied, then even if the weight ratio of aqueous resin to water insoluble resinous particles (on solid basis) be selected in a wide range of 98:2 to 45:55, there is no undesirable increase in viscosity irrespective of the increased solid content, which is attributable to the improvement of working property of the composition, and furthermore the thus obtained mixture is very stable for a long period of time because of its specific rheological properties, and can result in a film with excellent performance. On the basis of these findings, the inventors have filed a patent application (Japanese Patent Application No. 114686/81). The abovementioned aqueous coating composition was indeed very successful in improving application characteristic, storage stability, durability, and water resistance of water-borne paint, but was merely developed as surfacer and primer, like many previous proposals. As a top-coat requiring a highly glossy and flat coating, this composition cannot be said to be fully satisfactory in its desired film performance.

Under the circumstances, it has strongly been desired to have an aqueous type, top-coat paint composition capable of forming a coating with a higher gloss and flatness required for a top-coat, while maintaining the desired properties of aqueous resin in respect of pigment dispersibility and gloss and improving application characteristics (popping and sagging) and storage stability thereof. The inventors, in a series of studies for attaining the improvement in application characteristics of an aqueous paint composition by adding water insoluble resinous particles, thereby increasing the resin content, have continued studies on the correlation between the film properties and such factors as combination of resins used, properties of water insoluble resinous particles, compounding ratio of aqueous resin to water insoluble resinous particles, and solid content in the resinous composition. The inventors have now found that in a combination of a certain type of aqueous resin and water insoluble resinous particles, when the resinous particles are selected from those whose mean diameter is in a specific range, an aqueous type paint composition which is excellent in application characteristics and storage stability and is useful as a top-coat capable of producing a coating with higher gloss and flat surface can be obtained. Particular preference is given to the composition wherein the solid ratio of aqueous resin and water insoluble resinous particles is in a specific range. On the basis of these findings, the present invention has been completed.

SUMMARY OF THE INVENTION

The gist of the invention resides in an aqueous coating composition comprising a resinous vehicle composed of (A) at least one aqueous resin selected from the group consisting of polyester resins, alkyd resins, acrylic resins, acryl-modified polyester resins and acryl-modified alkyd resins, and (B) at least one component selected from water insoluble resinous particles obtained by polymerization or copolymerization of $\alpha, \beta$-ethylenically unsaturated monomers, the mean diameter of said water insoluble resinous particles being $0.01 \sim 0.1\mu$ and the weight ratio of said resin (A) to resin (B) being, on solid basis, $99:1 \sim 15:85$.

DESCRIPTION OF THE PREFERRED EMBODIMENTS

An aqueous resin (water soluble resin or water dilutable resin, hereinafter the same) used in the present invention is any member of polyester, alkyd, acryl, acryl-modified polyester or acryl-modified alkyd resins customarily used in the paint field. The polyester resin is a common member obtained by the polycondensation of polycarboxylic acid and polyhydric alcohol. Examples of said polycarboxylic acid are linear chain dicarboxylic acids such as oxalic acid, succinic acid, succinic anhydride, adipic acid, azelaic acid and sebacic acid; aromatic fatty acids such as phthalic acid, phthalic anhydride, isophthalic acid, tere-phthalic acid, tetrahydrophthalic anhydride, hexahydrophthalic acid, hexahydrophthalic anhydride, tetrabromophthalic anhydride, trimellitic acid, trimellitic anhydride, pyromellitic acid and pyromellitic anhydride; and unsaturated dicarboxylic acids such as maleic acid, maleic anhydride, fumaric acid and itaconic acid; and examples of said polyhydric alcohol are glycols such as ethyleneglycol, propyleneglycol, 1,3-butylenediol, 1,6-hexanediol, diethyleneglycol, neopentyl glycol, and triethylene glycol; hydrogenated bisphenol A, bis phenol dihydroxypropyl ether, glycerol, trimethylol ethane, trimethylol propane, pentaerythritol and the like. However, they should not be taken in a limitative sense and any materials customarily used for the preparation of common polyester resins may be satisfactorily used in the present invention. It is also possible to add, for the purpose of molecular weight control, monocarboxylic acid or monohydric alcohol in the reaction system.

Alkyd resins may be obtained by subjecting said polyester to an esterification with drying oil or its fatty acid. Suitable drying oil and fatty acid which may be used include linseed oil, tung oil, oiticica oil, dehydrated castor oil, coconut oil, dehydrated coconut oil, rice bran oil fatty acid, tall oil fatty acid, soybean oil, octyl acid and the like. The alkyd resins may be of epoxy-, rosin- or phenol resin-modified type. No detailed explanation for the preparation of these resins shall be required because they are well known.

In the present invention, acrylic resins may also be satisfactorily used. Such acrylic resins may be obtained by effecting polymerization of either one or any combination of the following monomers having, in the molecule, at least one, polymerizable ethylenic unsaturation bonding:

(1) carboxyl bearing monomer:
acrylic acid, methacrylic acid, crotonic acid, itaconic acid, maleic acid, fumaric acid, and the like.

(2) hydroxy bearing monomer:
2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like.

(3) nitrogen containing alkyl acrylate or methacrylate:
dimethylaminoethyl acrylate, dimethylaminoethyl methacrylate and the like.

(4) polymerizable amide:
acrylic amide, methacrylic amide and the like.

(5) polymerizable nitrile:
acrylonitrile, methacrylonitrile and the like.

(6) alkyl acrylate or alkyl methacrylate:
methyl acrylate, methyl methacrylate, ethyl acrylate, ethyl methacrylate, n-butyl acrylate, n-butyl methacrylate, 2-ethylhexyl acrylate and the like.

(7) polymerizable aromatic compound:
styrene, $\alpha$-methyl styrene, vinyl toluene, t-butyl styrene and the like.

(8) $\alpha$-olefin:
ethylene, propylene and the like.

(9) vinyl compound:
vinyl acetate, vinyl propionate and the like.

(10) diene compound:
butadiene, isoprene and the like.

Such $\alpha,\beta$-ethylenically unsaturated monomers are, in the presence of light, heat, organic peroxide or inorganic peroxide, or radical initiator such as azo compound, polymerized by any conventional polymerization means.

Another class of aqueous resins advantageously used in the present invention are acryl-modified polyester and acryl-modified alkyd resins, i.e. polyester and alkyd resins in which acryl polymer segments are included. Such acrylic modified resins may be obtained by any of the following methods:

(1) Preparation of acrylic resin in the presence of polyester or alkyd resin having unsaturation bonding:

In preparing a polyester by the polycondensation of polycarboxylic acid and polyhydric alcohol, unsaturated polyester may be obtained by using as a part of said polycarboxylic acid component an unsaturated acid such as, for example, maleic acid, maleic anhydride, fumaric acid, citraconic acid, itaconic acid, dimer acid or the like. Unsaturation bonding bearing alkyd resin may be prepared by reacting thus obtained unsaturated polyester with drying oil or fatty acid.

Acrylic monomers are then polymerized in the presence of such polyester or alkyd resin having unsaturation bonding, using as polymerization initiator a common free-radical catalyst such as, for example, azobisisobutyro-nitrile, benzoyl peroxide, di-t-butyl peroxide, cumene hydroperoxide and the like, or a chain transfer agent such as ethyl mercaptan, butyl mercaptan, dodecyl mercaptan, carbon tetrabromide, carbon tetrachloride and the like, to obtain the acryl-modified polyester or acryl-modified alkyd resin to be used in the present invention.

As the acrylic monomers, any of the abovementioned compounds having, in the molecule, at least one polymerizable, ethylenic unsaturation bonding customarily used in the preparation of acrylic resins may be satisfactorily used.

(2) Polymerization of acrylic monomers, at least part of which is an oxirane bearing ethylenically unsaturated monomer, in the presence of carboxyl bearing polyester or alkyd resin:

Polyester or alkyd resin usually contains carboxyl groups originated from the polycarboxylic acids. Therefore, when the abovesaid acrylic monomers, at least part of which is an oxirane bearing, ethylenically unsaturated monomer such as glycidyl acrylate, glycidyl methacrylate or the like, are polymerized in the presence of such carboxyl bearing polyester or alkyd resin, there is provided an acryl-modified polyester or alkyd resin.

(3) Polymerization of acrylic monomers, a part of which is carboxyl bearing monomer, in the presence of oxirane bearing polyester or alkyd resin:

From a polycarboxylic acid component and a polyhydric alcohol component having 2 or more oxirane groups, an oxirane bearing polyester or alkyd resin is first prepared. Thereafter, the abovesaid acrylic monomers, including carboxyl bearing $\alpha,\beta$-ethylenically unsaturated monomer such as, for example, acrylic acid, methacrylic acid, crotonic acid, itaconic acid, maleic acid or fumaric acid are reacted in the presence of said resin to obtain an acryl-modified polyester or alkyd resin to be used in the present invention.

(4) Reaction of carboxyl bearing polyester or alkyd resin (or acryl resin) and oxirane bearing acryl resin (or polyester or alkyd resin):

Carboxyl group is present on either of polyester or alkyd resin and acryl resin, and the oxirane group is present on the other resin. By the reaction of these two resins, the desired acryl-modified polyester or alkyd resin may be obtained.

(5) Polymerization of acrylic monomers in the presence of mercapto group bearing polyester or alkyd resin: Polyester or alkyd resin is first prepared by using mercapto group bearing polycarboxylic acid or polyhydric alcohol. The abovesaid acrylic monomers are then polymerized, using said polyester or alkyd resin as a chain transfer agent.

The above are typical methods for the preparation of the present acryl-modified polyester or alkyd resin. However, the invention is not limited to them, and any method may satisfactorily be used providing it yields an acryl-modified polyester or alkyd resin in which acrylic polymer segment(s) is (are) included in the polyester or alkyd resin.

Solubilization of such resin may be done by following conventional methods. For example, water solubility or water dilutability may be given to the resin by effecting neutralization of acidic group such as carboxyl with a basic material, e.g. monomethylamine, dimethyl amine, trimethylamine, monoethylamine, triethylamine, monoisopropylamine, diisopropylamine, diethylene triamine, triethylenetetramine, monoethanolamine, diethanolamine, triethanolamine, monoisopropanolamine, diisopropanolamine, dimethylethanolamine, morpholine, methyl morpholine, piperazine, ammonia, sodium hydroxide, potassium hydroxide and the like.

One or more of the abovementioned aqueous resins may be adequately selected in the invention. They may be of thermoplastic or thermosetting type. Thus, they may or may not carry functional groups which are mutually reactive with those of other aqueous resin and/or water insoluble resin, when heated. Examples of such functional groups are carboxylic group, sulfonic group, phosphoric group, hydroxyl group, oxirane group, active methylol group, amino group, reactive carbon-carbon unsaturation bonding, isocyanate group, blocked isocyanate group, halogen and the like. These groups may be incorporated into the resinous molecule by general methods such as selection of appropriate monomer in the preparation of said resin, control of polymerization reaction and the like, if desired.

In the present invention, besides the abovesaid aqueous resin(s), water insoluble resinous particles are used. The water insoluble resinous particles are composed of acrylic or vinyl polymers and copolymers obtained by the polymerization of ethylenically unsaturated compounds. In preparing such polymers or copolymers, use can be made of any compounds having one or more polymerizable ethylenic unsaturation bondings as already stated in connection with the preparation of the aqueous acrylic resin.

These polymers may be of crosslinked type. At this time, polymerization may be carried out with ethylenically unsaturated monomers, at least 2 of said monomers each having mutually reactive groups such as, for example, epoxy and carboxyl, amine and carboxyl, epoxy and carboxylic acid anhydride, amine and acid chloride, alkyleneimine and carbonyl, organoalkoxysilane and carboxyl, hydroxyl and isocyanate and the like. Alternatively, use can be made of a compound having in its molecule 2 or more ethylenic unsaturation bondings capable of radical polymerization (hereinafter called crosslinkable monomer). Examples of such crosslinkable monomers are polymerizable, unsaturated monocarboxylic acid ester of polyhydric alcohol, polymerizable unsaturated alcohol ester of polycarboxylic acid, and aromatic compound substituted with 2 or more vinyl groups, including ethyleneglycol acrylate, ethyleneglycol methacrylate, triethyleneglycol dimethacrylate, tetraethyleneglycol dimethacrylate, 1,3-butyleneglycol dimethacrylate, trimethylolpropane triacrylate, trimethylolpropane tri methacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimeth acrylate, pentaerythritol trimethacrylate, pentaerythritol tetramethacrylate, glycerol dimethacrylate, glycerol diacrylate, glycerol allyloxydimethacrylate, 1,1,1-trishydroxymethylethane triacrylate, 1,1,1-tris hydroxymethylethane triacrylate, 1,1,1-trishydroxy methylethane dimethacrylate, 1,1,1-trishydroxymethyl ethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimeritate, diallyl aterephthalate, diallyl phthalate, divinyl benzene and the like.

The fine particles of acrylic or vinyl polymer or copolymer used in the invention should have a mean grain diameter of 0.01 to $0.1\mu$, and preferably 0.02 to $0.08\mu$. Any of the known methods may be freely selected for the preparation of such polymer particles, provided that the mean grain diameter is in the abovesaid range. However, preference is given to emulsion polymerization wherein the monomers are polymerized in the presence of polymerization initiator, in an aqueous medium containing a surfactant, emulsifier or the like. The most preferable one may be the so-called seed emulsion method or the method wherein a water soluble oligomer is first prepared and an emulsion polymerization is then carried out, utilizing the thus formed oligomer as polymerization nucleus. Since the emulsion polymerization technique per se has been well known, there is no necessity of making further explanation on it.

In practicing the emulsion polymerization, any of the known surfactants or emulsifiers may be satisfactorily used. In place of or in addition to the said surfactant or emulsifier, use can be made of amphoteric ion resin as described in, for example, Japanese Patent Application Nos. 110865/79; 56048/80; 116293/80; 123899/78; 47652/80; 71864/81 and 13053/82. This method is especially useful in that the non-volatile content can be increased without undesirable increase in the viscosity of the resinous composition, and excellent storage stability can be realized with the thus obtained emulsion. Examples of the polymerization initiator are organic peroxides as benzoyl peroxide, t-butyl peroxide, cumene hydroperoxide and the like; organic azo compounds as azobiscyanovaleric acid, azobisisobutyronitrile, azobis(2,4-dimethyl)valeronitrile, azobis(2-amidino propane) hydrochloride and the like; inorganic water soluble radical initiators such as potassium persulfate, ammonium persulfate, sodium persulfate, hydrogen peroxide and the like; redox initiators and the like. As the chain transfer agent, use can be made of mercaptans such as ethyl mercaptan, butyl mercaptan, dodecyl mercaptan and the like, and carbon halogenides such as carbon tetrabromide, carbon tetrachloride and the like. The weight ratio of these ancillary materials and reaction medium, i.e. surfactant, emulsifier, polymerization initiator, chain transfer agent and water, and polymerization procedures are all of public knowledge. In an emulsion polymerization, an aqueous medium is customarily used to obtain an emulsion in which water insoluble resinous particles are uniformly dispersed. In the present invention, thus formed emulsion may be directly compounded with the aqueous resin.

Alternatively, the emulsion may be concentrated before adding the aqueous resin or the resinous particles may be isolated from the emulsion and then added to the aqueous resin. Therefore, the reaction medium is not limited to water alone, and it is possible to use the so-called NAD method with non-aqueous solvent to obtain the water insoluble resinous particles of the present invention.

As already stated, the present water insoluble resinous particles should have a mean grain diameter as defined hereinbefore. This is because, if the mean grain diameter is outside the abovesaid range, there is a tendency that the coating will become deficient in gloss and flatness and cannot fully meet the requirements of a top-coat.

The present water insoluble resinous particles may be composed of one or more of the abovesaid polymers or copolymers. They may carry functional groups capable of reacting with each other when heated or with the functional groups possessed by the aqueous resins. Thus, the present composition comprising aqueous resin and resinous particles may be thermoplastic or thermosetting as a whole.

In the coating composition of this invention, it is essential that said aqueous resin and water insoluble resinous particles are combined together in the ratio (on solid basis) of 99~15% by weight of the former to 1~85% by weight of the latter. This is because, if less of the aqueous resin is used, there is a tendency that dispersion stability of the resinous particles be decreased and the coating flatness be lost, and if the amount of water insoluble resinous particles is less than 1% by weight, it is unable to attain the objects of the invention as a top-coat. As the reaction medium, water is generally used. However, hydrophilic, polar organic solvents may co-exist, if desired. Examples of such organic solvent are ethyleneglycol monomethyl ether, ethyleneglycol monoethylether, ethyleneglycol monobutylether, methanol, ethanol, isopropanol, n-butanol, sec-butanol, t-butanol, dimethylformamide and the like.

The proportion of water medium to resinous component is rather variable for the following reason. Usually, solid content of 10 to 80% is suitable for spray coating, 5 to 90% for brush coating, and 1 to 60% for dipping application. However, the present coating composition is characterized by having an excellent dispersion stability of the resinous particles and hence, the composition can be maintained for a longer period of time, with relatively higher solid content, and diluted to the desired solid content just before the use thereof.

In the present invention, the coating composition comprises an essential components, said aqueous resin, water insoluble resinous particles and aqueous medium, and it is useful as a clear paint as it is, to obtain a coating with excellent gloss and flatness. Furthermore, to this resinous composition, pigment, crosslinking agent and other additives may be added according to general paint manufacturing technique, and mixed well to obtain an aqueous coating composition for a colored top-coat having improved application characteristics, durability and capable of forming a coating with excellent gloss and flat surface. At this time, any coloring matters usually employed for top-coat paint may be satisfactorily used. For compounding the coloring matter, it is preferred to make a colored paste using a part of the aqueous resin and the coloring matter and to add to the colored paste the remaining amount of aqueous resin, resinous particles and other additives and subject the mixture to a mixing and dispersing procedure using a known dispersing means such as gate mixer, high speed disperser and the like. However, it is of course possible to add from the first all of the above said components to a dispersing device and make a dispersion therewith.

Crosslinking agent may also be included in the present coating composition, if desired. Examples of such materials are aminoplasts like melamine-formaldehyde resin, methoxy modified or butoxy modified melamine-formaldehyde resin, urea resin, thiourea resin, guanamine resin, acetoguanamine resin and the like; isocyanate compounds such as isocyanate, polyisocyanate, blocked polyisocyanate and the like; and phenol resins. If desired, other conventional additives such as antisagging agent, antisagging agent, antiflooding agent, antifish-eyes agent, surface tension regulator, antioxidant, light stabilizer, UV absorber and the like may also be added. The compounding ratio of the coloring matter, crosslinking agent and other additives, and procedures, are conventional and one may follow any conventional techniques known in the related technical field. The present coating composition may be directly or after dilution with water, applied by usual application means as spraying, dipping and brushing and dried or subjected to baking to obtain a top-coat with improved gloss, flatness and durability. Also, the coating composition can exhibit storage stability and application characteristics and hence is very useful as an aqueous coating composition for a top-coat.

The invention shall be now more fully explained in the following Examples. Unless otherwise stated, all parts are by weight.

REFERENCE EXAMPLE 1

Into a 2 liter flask fitted with stirrer, condenser, and thermoregulator, were placed 73.5 parts of the sodium salt of taurine, 100 parts of ethyleneglycol and 200 parts of ethyleneglycol monoethylether, and the temperature was raised, while stirring, to 120° C. After the contents had uniformly melted, a solution of 470 parts of Epicote 1001 (bisphenol A diglycidyl ether type epoxy resin, manufactured by Shell Chem. Co., epoxy equivalent 470) and 400 parts by ethyleneglycol monoethyl ether was added dropwise in 2 hours. After completion of said addition, the mixture was stirred and heated for 20 hours to complete the reaction. The reaction mixture was acidified with hydrochloric acid and the precipitated product was filtered, purified by reprecipitation with ethyleneglycol monoethyl ether and water, and dried under reduced pressure to obtain 205 parts of modified epoxy resin. Acid value of this resin measured by means of KOH titration was 48.6 and sulfur content determined by fluorescent X-ray method was 3%.

REFERENCE EXAMPLE 2

Into a 2 liter flask with stirrer, nitrogen inlet, thermoregulator, condenser and decanter, were placed 134 parts of bis-hydroxyethyl taurine, 130 parts of neopentylglycol, 236 parts of azelaic acid, 186 parts of phthalic anhydride and 27 parts of xylene and the temperature was raised. The formed water was continuously removed azeotropically with xylene. The temperature was, in 2 hours from the commencement of reflux, raised to 190° C. and stirring and dehydration were continued until the acid value based on the carboxylic acid combined reached 145. The reaction mixture was then allowed to cool to 140° C. Next, while maintaining the temperature of 140° C., 314 parts of Cardura E-10 (glycidyl ester of versatic acid, manufactured by Shell Chem. Co.) were added dropwise over 30 minutes, and thereafter, the mixture was stirred for 2 hours to complete the reaction. Thus obtained polyester resin had an acid value of 59, hydroxyl value of 90 and number average molecular weight of 1,054.

MANUFACTURING EXAMPLE 1

Into a 1 liter reaction vessel fitted with stirrer, thermoregulator, and condenser, were placed 35.5 parts of sodium dodecyl sulfate, 480 parts of deionized water 93 parts of divinylbenzene and 2 parts of sodium persulfate and the temperature was, while stirring, raised to 80° C. To this, was dropwise added an aqueous solution of 0.61 part of sodium bisulfite and 50 parts of deionized water in 1 hour and stirring was continued for 30 minutes to complete the reaction. Thus obtained emulsion had a non-volatile content of 15% and resinous particles constituting the emulsion had a mean grain diameter of 0.035$\mu$.

MANUFACTURING EXAMPLE 2

Into a reaction vessel fitted with stirrer, were placed 216 parts of deionized water and the temperature was raised to 80° C. To this, was added a mixed solution of 4.5 parts of azobis-cyanovaleric acid, 4.3 parts of dimethylethanolamine and 45 parts of deionized water while stirring and keeping said temperature. Next, a first mixed solution of 30 parts of N-methyl-N-(vinylbenzyl) taurine, 10 parts of dimethylethanolamine and 90 parts of deionized water, and a second mixed solution of 62 parts of methyl methacrylate, 62 parts of styrene, 83 parts of n-butylacrylate and 3 parts of ethyleneglycol dimethacrylate were simultaneously dropwise added in 60 minutes at the same temperature. After completion of said addition, a mixed solution of 1.5 parts of azobis-cyanovaleric acid, 1.6 parts of dimethylethanolamine and 15 parts of deionized water was added at the same temperature and the mixture was stirred for 60 minutes to obtain an emulsion having a non-volatile content of 45%, pH 7.2 and viscosity (25° C.) 40 cps. Average grain diameter of resinous particles was 0.08$\mu$.

MANUFACTURING EXAMPLE 3

Into a 2 liter reaction vessel fitted with stirrer, condenser, thermoregulator and nitrogen inlet, were placed 408 parts of deionized water, 16 parts of N-(2-hydroxydodecyl)-2-aminoethane sulfonic acid and 4.4 parts of dimethylethanolamine, and to this, while stirring and maintaining the temperature at 80° C., was added a solution of 6.4 parts of azobis-cyanovaleric acid, 64 parts of deionized water and 6.1 parts of dimethylethanolamine. Next, at the same temperature, was added dropwise a mixture of 107 parts of methyl methacrylate, 142 parts of n-butylacrylate, 107 parts of styrene, 40 parts of 2-hydroxyethyl acrylate and 4 parts of ethyleneglycol dimethacrylate in 60 minutes. After completion of said addition, a solution of 1.6 parts of azobis-cyanovaleric acid, 16 parts of deionized water and 1.5 parts of dimethylethanolamine was added and the combined mixture was stirred at 80° C. for 60 minutes to obtain an emulsion having a non-volatile content of 45%, pH 7.3 and viscosity (25° C.) 138 cps. Average grain diameter of the resinous particles was 0.09$\mu$.

MANUFACTURING EXAMPLE 4

Into a 1 liter reaction vessel fitted with stirrer, condenser and thermoregulator, were placed 306 parts of deionized water, 6 parts of modified epoxy resin obtained in Reference Example 1 and 0.8 part of dimethylaminoethanol, and the mxiture was stirred and raised to 80° C. After the contents had been melted, a mixed solution of 4.8 parts of azobis-cyanovaleric acid, 4.56 parts of dimethylaminoethanol and 48 parts of deionized water was, while stirring and maintaining the temperature at 80° C., added and then a mixed solution of 81 parts of styrene, 81 parts of methyl methacrylate, 108 parts of n-butylacrylate and 30 parts of 2-hydroxyethyl acrylate was dropped in 60 minutes. Next, at the same temperature, a mixed solution of 1.2 parts of azobis-cyanovaleric acid, 1.14 parts of dimethylaminoethanol and 12 parts of deionized water was added and the combined mixture was stirred for 60 minutes to obtain an emulsion having a non-volatile content of 45%, pH 7.2 and viscosity 96 cps. Average grain diameter of the resinous particles was $0.065\mu$.

MANUFACTURING EXAMPLE 5

Into a 1 liter reaction vessel fitted with stirrer, condenser and thermoregulator, were placed 306 parts of deionized water, 45 parts of modified epoxy resin obtained in Reference Example 1 and 6 parts of dimethylethanolamine, and the mixture was, while stirring and heating to 80° C., thoroughly melted. Thereafter, a mixed solution of 4.8 parts of azobiscyanovaleric acid, 4.56 parts of dimethylethanolamine and 48 parts of deionized water was added under stirring and maintaining the temperature at 80° C., and then a mixed solution of 67 parts of styrene, 67 parts of methyl methacrylate, 85 parts of n-butylacrylate, 30 parts of 2-hydroxyethylacrylate and 6 parts of ethyleneglycol dimethacrylate was added dropwise in 150 minutes. After completion of said addition, a mixture of 1.2 parts of azobis-cyanovaleric acid, 1.14 parts of dimethylethanolamine and 12 parts of deionized water was added at the same temperature and the combined mixture was stirred for 60 minutes to obtain an emulsion having a non-volatile content of 45%, pH 7.2 and viscosity 72 cps (25° C.). Average grain diameter of the resinous particles was $0.040\mu$.

MANUFACTURING EXAMPLE 6

Into a 1 liter reaction vessel fitted with stirrer, condenser and thermoregulator, were placed 271 parts of deionized water, 80 parts of modified epoxy resin obtained in Reference Example 1 and 10.7 parts of dimethylethanolamine, and the contents were, while stirring and heating to 80° C., thoroughly melted. To this, while still stirring and maintaining the temperature at 80° C., there was added a mixed solution of 3.2 parts of azobiscyano valeric acid, 3 parts of dimethylethanolamine and 48 parts of deionizewd water and then dropwise a mixture of 94 parts of styrene, 12 parts of 2-hydroxyethyl acrylate and 94 parts of ethylene glycol dimethyacrylate in 150 minutes. After completion of said addition, a mixed solution of 0.8 part of azobiscyano valeric acid, 0.76 part of dimethylethanol amine and 12 parts of deionized water was added at the same temperature and the combined mixture was stirred for 60 minutes to obtain an emulsion having a non-volatile content of 45%, pH 7.6 and viscosity 133 cps (25° C.). Average grain diameter of the resinous particles was $0.045\mu$.

MANUFACTURING EXAMPLE 7

Into a 1 liter reaction vessel fitted with stirrer, condenser and thermoregulator, were placed 306 parts of deionized water, 30 parts of polyester resin obtained in Reference Example 2 and 3 parts of dimethylethanolamine and the contents were, while stirring and maintaining the temperature at 80° C., thoroughly melted. To this, was added a mixture of 4.5 parts of azobiscyano valeric acid, 45 parts of deionized water and 4.3 parts of dimethylethanolamine and then dropwise a mixed solution of 63 parts of methyl methacrylate, 84 parts of n-butyl acrylate, 63 parts of styrene, 30 parts of 2-hydroxyethyl acrylate and 30 parts of ethyleneglycol dimethacrylate in 60 minutes. After completion of said addition, a solution of azobiscyano valeric acid, 15 parts of deionized water and 1.4 parts of dimethylethanolamine was added and the combined mixture was stirred for 60 minutes at 80° C. to obtain an emulsion having a non-volatile content of 45%, pH 7.4 and viscosity 110 cps (25° C.). Average grain diameter of the resinous particles was $0.075\mu$.

The following resinous particles were prepared for comparison.

MANUFACTURING EXAMPLE 8

Preparation of comparative resinous particles No. 1

Into a similar reaction vessel as used in Manufacturing Example 1, were placed 700 parts of deionized water and 10 parts of sodium dodecylbenzene sulfonate and the temperature was raised to 80° C. To this were added, while still stirring, 4.5 parts of ammonium persulfate and then dropwise a monomer mixture of 360 parts of methyl methacrylate, 105 parts of 2-ethyl hexyl acrylate, 35 parts of 2-hydroxyethyl acrylate and 10 parts of n-dodecylmercaptan in 2 hours. After completion of said addition, to the mixture was added an aqueous solution of 0.5 part of ammonium persulfate and 50 parts of deionized water and the resultant mixture was stirred for 1 hour to complete the reaction. Thus obtained emulsion had a non-volatile content of 40%, average grain diameter of resinous particles being $0.19\mu$ and number average molecular weight of the resin being 8,200.

MANUFACTURING EXAMPLE 9

Preparation of comparative resinous particles No. 2

In a similar reaction vessel as used in the abovesaid preparation example, were placed 900 parts of deionized water, 1.5 part of Metholose 60SH-50 (methyl cellulose, manufactured by Shinetsu Kagaku), 216 parts of methyl methacrylate, 63 parts of 2-ethylhexyl acrylate, 21 parts of 2-hydroxyethyl acrylate, 6 parts of n-dodecylmercaptan, and 6 parts of azobisisobutyronitrile, and the mixture was stirred at 250 rpm at 65° C. for 7 hours to complete the reaction. Thus obtained suspension was filtered through 200 mesh sieve to obtain pearl particles having diameters of 20 to $600\mu$. The particles were ball-milled for 24 hours to obtain the resinous particles having an average grain diameter of $18\mu$ and a maximum diameter of $45\mu$, the molecular weight being 7,600.

MANUFACTURING EXAMPLE 10

Preparation of aqueous resin No. 1

Into a 2 liter glass reaction vessel fitted with stirrer, thermoregulator and decanter, were placed 420 parts of safflower oil, 254 parts of neopentylglycol, 6 parts of trimethylol ethane, 120 parts of phthalic anhydride, 240 parts of trimellitic anhydride and 25 parts of xylene, and the mixture was stirred and heated. While maintaining the reaction temperature at 190° to 210° C. and removing the formed water by azeotropic distillation from the reaction mixture, polyesterification was continued for 5 hours to obtain an alkyd resin having acid value of 56, OH value of 40, number average molecular weight of 1600 and oil length of 40. Next, the resin was diluted with 190 parts of ethylene glycol monobutyl ether and 95 parts of isopropanol, neutralized with 89 parts of dimethylethanolamine and mixed with 601 parts of deionized water to obtain an aqueous varnish having a non-volatile content of 50%.

MANUFACTURING EXAMPLE 11

Preparation of aqueous resin No. 2

Into a similar reaction vessel as used in Manufacturing Example 10, were placed 273 parts of tall oil fatty acid, 197 parts of trimethylolpropane, 78 parts of neopentylglycol, 91 parts of hydrogenated bisphenol A, 204 parts of isophthalic acid, 157 parts of trimellitic anhydride and 20 parts of xylene and the mixture was stirred and heated. While maintaining the reaction temperature at 180° to 210° C. and removing the formed water therefrom, the reaction was continued for 5 hours to obtain an alkyd resin having acid value of 65, OH value of 100, number average molecular weight of 1500 and oil length of 30. Thereafter, to the resin was added 183 parts of ethyleneglycol monobutyl ether and 96 parts of dimethyl ethanolamine and then the resultant mixture was diluted with 832 parts of deionized water to obtain an aqueous varnish having a non-volatile content of 45%.

MANUFACTURING EXAMPLE 12

Preparation of aqueous resin No. 3

Using the same procedures as stated in Manufacturing Example 11, polyester resin having acid value of 55, OH value of 100 and number average molecular weight of 1500 was prepared from 69 parts of trimethylol propane, 297 parts of neopentylglycol, 91 parts of hydrogenated bisphenol A, 201 parts of isophthalic acid, 186 parts of tetrahydrophthalic acid, 155 parts of trimellitic anhydride, and 10 parts of xylene.

Next, 183 parts of ethyleneglycol monobutyl ether and 82 parts of dimethylethanolamine were added and the mixture was diluted with 851 parts of deionized water to obtain an aqueous varnish of non-volatile content 45%.

MANUFACTURING EXAMPLE 13

Preparation of aqueous resin No. 4

Into a 1 liter reaction vessel fitted with stirrer, thermoregulator and condenser, were placed 76 parts of ethyleneglycol monobutylether, and to this was dropwise added 61 parts of a monomeric mixture of 45 parts of styrene, 63 parts of methyl methacrylate, 48 parts of 2-hydroxyethyl methacrylate, 117 parts of n-butylacrylate, 27 parts of methacrylic acid, 3 parts of laurylmercaptan, and 3 parts of azobisisobutyronitrile, and the temperature was raised to 120° C. under stirring. The remaining 245 parts of the monomeric mixture was then dropwise added in 3 hours and the mixture was stirred for an additional 1 hour. Thereafter, 28 parts of dimethylethanolamine and 200 parts of deionized water were added to obtain an acryl resinous varnish having a non-volatile content of 50%, number average molecular weight of the resin being 6000.

MANUFACTURING EXAMPLE 14

Preparation of aqueous resin No. 5

Into a 1 liter reaction vessel fitted with stirrer, thermoregulator and condenser, were placed 117 parts of dehydrated castor oil, 173 parts of soybean oil, 17 parts of glycerol, 61 parts of pentaerythritol, 132 parts of phthalic anhydride, and 7.5 parts of xylene, and the mixture was, while maintaining the reaction temperature at 180° to 220° C. and removing the formed water therefrom, reacted for 3 hours to obtain an alkyd resin having oil length of 57%, acid value of 10, and number average molecular weight of 1800. This resin was diluted with xylene to obtain an alkyd resin varnish having a non-volatile content of 60%. Into a similar reaction vessel as stated hereinabove, were placed 200 parts of said alkyd resin varnish and 104 parts of ethyleneglycol monobutyl ether and the mixture was stirred and heated to 130° C. A monomeric mixture of 60 parts of styrene, 102 parts of methyl methacrylate, 65 parts of 2-hydroxyethyl methacrylate, 31 parts of acrylic acid, 143 parts of n-butylacrylate, 6 parts of di-t-butylperoxide and 8 parts of lauryl mercaptan was dropwise added in 3 hours and the reaction was further continued for 1 hours. Thus obtained acryl modified alkyd resin had an acid value of 50 and number average molecular weight of 7300. The abovesaid reaction mixture was then subjected to 100% neutralization with dimethylethanolamine and diluted with deionized water to obtain an aqueous varnish having a non-volatile content of 50%.

MANUFACTURING EXAMPLE 15

Preparation of aqueous resin No. 6

Into a similar reaction vessel as used in Manufacturing Example 14, were placed 169 parts of neopentylglycol, 6 parts of trimethylolethane, 46 parts of hydrogenated bisphenol A, 174 parts of isophthalic acid, 65 parts of adipic acid, 40 parts of maleic anhydride and 10 parts of xylene, and the mixture was stirred and heated. The reaction was continued, while maintaining the temperature at 190° to 210° C. and removing the formed water therefrom, for 4 hours to obtain a polyester resin having an acid value of 48 and number average molecular weight of 1200. This resin was diluted with ethyleneglycol monobutyl ether to obtain a polyester resinous varnish having a non-volatile content of 80%. Following the procedure of the latter half of Manufacturing Example 14 but substituting 150 parts of the abovesaid polyester resinous varnish for 200 parts of alkyd resinous varnish and 154 parts of ethyleneglycol monobutyl ether for 104 parts of ethyleneglycol monoethyl ether, an acryl modified polyester resin having an acid value of 50 and number average molecular weight of 6500 was obtained, which was then subjected to 100% neutralization with dimethylethanolamine and diluted with deionized water to obtain an aqueous varnish having a non-volatile content of 50%.

MANUFACTURING EXAMPLE 16

Preparation of pigment pastes

Into a 1.5 liter closed stainless steel vessel, were placed 178 parts of aqueous resin No. 2, 320 parts of Taipake R-820 (rutile type titanium oxide, manufactured by Ishihara Sangyo) and 60 parts of deionized water. To this, were added 500 cc of glass beads and the contents were premixed with a stirrer and then mixed well by means of paint conditioner for 2 hours to obtain a pigment paste No. 1.

Repeating the same procedures but substituting aqueous resin No. 3 for No. 2, pigment paste No. 2 was prepared. Using 160 parts of aqueous resin No. 4 in place of aqueous resin No. 2 and 78 parts of deionized water, pigment paste No. 3 was prepared. Using the same procedures but substituting aqueous resin No. 5 and No. 6 for No. 2, pigment pastes No. 4 and No. 5 were prepared, respectively.

EXAMPLE 1 AND COMPARATIVE EXAMPLE 1

The resinous dispersion obtained in Manufacturing Example 1 was subjected to vacuum concentration to obtain a concentrated emulsion containing resinous particles No. 1, whose non-volatile content was 45%. Into a 500 cc stainless beaker, were weighed 210 parts of aqueous resin No. 1 and 91 parts of resinous particles No. 8 (solid) and the contents were mixed well by using a stirrer to obtain a clear paint. This paint was applied by curtain coating on a glass plate and baked at 120° C. for 20 minutes. Thus obtained coating was clear and had a flat surface and showed no abnormality even after dipping in tap water for 24 hours. This paint was then diluted with water to Ford cup #4 viscosity of 30 seconds and used in spray coating. The maximum film thickness showing no sagging was 35μ.

For comparison, aqueous resin No. 1 alone was, after adjusting the viscosity in a similar way, applied by spray coating means. At this time, the maximum film thickness showing no sagging was less than 15μ.

EXAMPLES 2 TO 8 AND COMPARATIVE EXAMPLES 2 TO 4

Preparation of coating composition

In a stainless steel vessel, the materials shown in Table 1 were placed and mixed well by means of a mixer at room temperature to obtain the respective coating composition.

Table 2 shows the materials used for the preparation of the comparative coating compositions.

Application and evaluation of coating

The respective coating composition was diluted with deionized water to Ford cup #4 viscosity of 30 seconds. Following the normal procedure, the composition was applied onto steel plates by spraying and after setting for 5 minutes, baked at 150° C. for 15 minutes to obtain a crosslinked coating.

The maximum film thickness showing no pinhole, the maximum film thickness showing no sagging, and gloss for the respective coating were given in Table 3.

TABLE 1

| | (parts) | | | | | | | | | | | |
|---|---|---|---|---|---|---|---|---|---|---|---|---|
| | pigment paste | | | aqueous resin | | | | resinous particles | | | | |
| Example | 1 | 2 | 3 | 1 | 2 | 3 | 4 | 2 | 3 | 4 | 5 | 6 | 7 | MF |
| 2 | 70 | | | | 40 | | | 62 | | | | | | 12 |
| 3 | 140 | | | | 80 | | | | 53 | | | | | 14 |
| 4 | 140 | | | 72 | | | | | | 14 | | | | 14 |
| 5 | | 35 | | | 20 | | | | | | 125 | | | 6 |
| 6 | | 140 | | | 80 | | | | | | | 83 | | 6 |
| 7 | | 140 | | | 40 | 40 | | | | | | | 31 | 14 |
| 8 | | | 140 | | | 80 | | | | | 50 | | | 14 |

MF: hexamethoxy methylol melamine (solid 100%)

TABLE 2

| | (parts) | | | | | | | |
|---|---|---|---|---|---|---|---|---|
| Comp. | pigment paste | | Aqueous resin | | | present resin. | comparative | comparative | |
| Example | 1 | 2 | 1 | 2 | 3 | particles No. 1 | res. part. No. 1 | res. part. No. 2 | MF |
| 2 | 14 | | 8 | | | 112 | | | 1 |
| 3 | | 140 | | 76 | | | 54 | | 23 |
| 4 | 140 | | | | 89 | | | 25 | 15 |

TABLE 3

| Exam. | pinhole | sagging | gloss |
|---|---|---|---|
| 2 | | | |
| 3 | | | |
| 4 | | | |
| 5 | | | |
| 6 | | | |
| 7 | | | |
| 8 | | | |
| comp. exam. | | | |
| 2 | | | |
| 3 | X | Δ | |
| 4 | X | Δ | X |
| maximum film thick. showing no pinhole | maximum film thick. showing no sagging | gloss 60° gloss value | |
| more than 50μ more than 40μ Δ 30~40μ X less than 30μ | more than 50μ more than 40μ Δ 30~40μ X less than 30μ | more than 90 more than 85 Δ 80~85 X less than 80 | |

Examples 9 to 13 and Comparative Examples 5 to 6

Into a stainless steel vessel, the materials shown in Table 4 were weighed and the contents were stirred well by means of a stirrer to obtain the coating compositions. According to the procedures of Examples 2 to 8, baked coatings were prepared and evaluated in the same way. The results are shown in Table 5.

TABLE 4

| Ex. | pig. paste | | aq. resin | | resinous partcls. | | | | | |
|---|---|---|---|---|---|---|---|---|---|---|
| No. | 4 | 5 | 5 | 6 | 1 | 2 | 3 | 5 | 7 | c.2 | MF |
| 9 | 70 | | 36 | | 62 | | | | | | 12 |
| 10 | 140 | | 72 | | | | 53 | | | | 14 |
| 11 | 140 | | | 65 | | | 14 | | | | 14 |
| 12 | | 35 | 18 | | | | | 125 | | | 6 |
| 13 | | 140 | 72 | | | | | | 83 | | 6 |
| Comp. Ex. | | | | | | | | | | | |
| 5 | 140 | | 120 | | | | | | | | 20 |
| 6 | 140 | | 80 | | | | | | | 52 | 15 |

TABLE 5

| Ex. No. | pinhole | sagging | gloss |
| --- | --- | --- | --- |
| 9 | | | |
| 10 | | | |
| 11 | | | |
| 12 | | | |
| 13 | | | |
| Comp. Ex. | | | |
| 5 | X | X | |
| 6 | X | Δ | X |

What is claimed is:

1. An aqueous coating composition comprising:
   (A) at least one aqueous resin selected from the group consisting of acryl resins, alkyd resins, polyester resins, acryl-modified alkyd resins and acryl-modified polyester resins and
   (B) at least one component selected from water-insoluble resinous particles having an average grain diameter of 0.01–0.1μ, obtained by polymerization of at least one ethylenically unsaturated compound, the solid weight ratio of said (A) to (B) being 99:1–15:85.

2. A composition according to claim 1 wherein the average grain diameter of the water-insoluble resinous particles is 0.02–0.08μ.

3. A composition according to claim 1 wherein the polymerization of the ethylenically unsaturated compound is effected by emulsion polymerization.

4. A composition according to claim 3 wherein an amphoteric ion compound or amphoteric ion containing resin is used as an emulsifier in said emulsion polymerization.

5. A composition according to claim 2 wherein the polymerization of the ethylenically unsaturated compound is effected by emulsion polymerization.

6. A composition according to claim 5 wherein an amphoteric ion compound or amphoteric ion containing resin is used as an emulsifier in said emulsion polymerization.

* * * * *